(12) United States Patent
Aiello (10) Patent No.: US 9,714,060 B2
(45) Date of Patent: Jul. 25, 2017

(54) MODULAR TRAILER APPARATUS

(71) Applicant: Mike Dale Aiello, Riverton, UT (US)

(72) Inventor: Mike Dale Aiello, Riverton, UT (US)

( * ) Notice: Subject to any disclaimer, the term of this patent is extended or adjusted under 35 U.S.C. 154(b) by 68 days.

(21) Appl. No.: 14/976,706

(22) Filed: Dec. 21, 2015

(65) Prior Publication Data
US 2016/0185407 A1   Jun. 30, 2016

Related U.S. Application Data

(60) Provisional application No. 62/097,462, filed on Dec. 29, 2014.

(51) Int. Cl.
*B62D 63/06* (2006.01)
*B60D 1/155* (2006.01)

(52) U.S. Cl.
CPC ........... *B62D 63/061* (2013.01); *B60D 1/155* (2013.01)

(58) Field of Classification Search
CPC .............................. B62D 63/061; B60D 1/155
USPC ....................................................... 280/491.2
See application file for complete search history.

(56) References Cited

U.S. PATENT DOCUMENTS

| | | | | |
|---|---|---|---|---|
| 4,563,018 A * | 1/1986 | Stage | ........................ | B60P 3/06 212/238 |
| 4,589,670 A * | 5/1986 | Sweetin | ................. | B60D 1/155 280/405.1 |
| 4,993,910 A * | 2/1991 | Rigg | ....................... | B60P 3/125 280/402 |
| 5,474,320 A * | 12/1995 | Bojarski | ............... | B62D 13/04 280/460.1 |
| 6,585,285 B2 * | 7/2003 | Koch | .................... | B62D 63/061 224/924 |
| 6,623,028 B1 * | 9/2003 | Johnston | .............. | B62D 63/061 280/656 |
| 6,962,370 B2 * | 11/2005 | Simpson | .............. | B62D 63/061 280/47.34 |
| 7,097,182 B1 * | 8/2006 | Liu | ........................... | B62B 3/02 280/42 |
| 7,455,312 B2 * | 11/2008 | Senatore | .................. | B60D 1/54 280/475 |
| 7,651,117 B1 * | 1/2010 | McGee | ................. | B62D 63/061 280/639 |
| 2013/0038038 A1 * | 2/2013 | Bernard | ............... | B62D 63/062 280/415.1 |
| 2014/0312593 A1 * | 10/2014 | Bank | .................... | B62D 63/061 280/400 |
| 2015/0298594 A1 * | 10/2015 | Fisk | .......................... | B60P 3/04 280/491.4 |

* cited by examiner

*Primary Examiner* — Jacob Knutson
(74) *Attorney, Agent, or Firm* — A Terrece Pearman (57) ABSTRACT

A modular trailer apparatus, which in some embodiments may include a bed coupled to a frame having a length and width. A first transportation conveyance for contacting a ground surface and a second transportation conveyance for contacting a ground surface may be coupled to opposing sides of the frame. The apparatus may further include a towing arm comprising a bed element movably coupled to a tow element. The bed element may be coupled to the frame and the tow element may be coupled to a trailer coupler configured to be secured to ball hitches or any other tow hitch. In further embodiments, the tow element may be movably coupled to the bed element between an extended position and a retracted position.

2 Claims, 13 Drawing Sheets

MODULAR TRAILER APPARATUS

CROSS REFERENCE TO RELATED APPLICATIONS

This application claims priority to and the benefit of the filing date of U.S. Provisional Application No. 62/097,462, filed on Dec. 29, 2014, entitled "MODULAR TRAILER APPARATUS", which is hereby incorporated by reference in its entirety.

FIELD OF THE INVENTION

This patent specification relates to the field of towable trailers. More specifically, this patent specification relates to modular trailers that are collapsible for storage and reconfigurable for different situations.

BACKGROUND

Different configurations of trailers for use in sport or utility purposes are known in the art. These trailers are generally towed by vehicles such as cars, trucks, tractors, all-terrain vehicles and the like. Conventional practice is to manufacture a trailer that is designed for use in one specific activity. For example, trailers are commonly manufactured to be towed by cars and trucks over relatively smooth surfaces and on-road applications. Other trailers are commonly manufactured to be towed by trucks and all-terrain vehicles over relatively rough surfaces and off-road applications. In addition, trailers are often designed around transporting certain sizes and shapes of cargo. Trailers having small beds and walls are often used for holding cargo such as tools, lumber, furniture, gravel, and the like, while trailers having large beds and walls are often used for transporting large and bulky cargo.

The most common drawback to these trailers is that while a trailer may excel in one scenario, it may be less than ideal for other applications. Smaller trailers excel at requiring less space for storage and movement, but are unable to accommodate larger loads. Larger trailer excel at accommodating larger loads, but require larger amounts of space for storage and movement. Also, trailers that may be configured to be towed by all-terrain vehicles may not be able to reliably be towed by larger on road vehicles. To overcome these limits, end users typically are required to buy more than one type of trailer to accommodate different needs. Not only do multiple trailers create a financial burden to the end user, but they also increase the amount of storage space required for the trailers when not in use.

Furthermore, even currently available relatively small trailers are difficult to store when not in use. For example, on excursions that are temporary in nature, once the end user arrives at a destination, the trailer must be stored until it is time to leave that destination. For destinations that are not spacious, the trailer must often be stored a distance away from the destination which increases the possibility of theft of the trailer. Even for trailers that are able to be stored at a destination, a risk exists for the trailer to become damaged during storage through activities that may occur at the destination.

Therefore, a need exists for novel trailer apparatuses for moving cargo to destinations. There also exists a need for novel trailer apparatuses that are able to transport different sizes and shapes of cargo. There is a further need for novel trailer apparatuses that are reconfigurable for use in off-road and on-road applications and that are able to be towed by different types and sizes of vehicles. Finally, there exists a need for novel trailer apparatuses that may be compacted for storage.

BRIEF SUMMARY OF THE INVENTION

A modular trailer apparatus configured to be towed by a vehicle and assembled and disassembled without the need for tools is provided. In some embodiments the apparatus may comprise a bed 11 coupled to a frame having a length and width. A first transportation conveyance for contacting a ground surface and a second transportation conveyance for contacting a ground surface may be coupled to opposing sides of the frame. The apparatus may further include a towing arm comprising a bed element movably coupled to a tow element. The bed element may be coupled to the frame and the tow element may be coupled to a trailer coupler configured to be secured to ball hitches or any other tow hitch.

In further embodiments, the tow element may be movably coupled to the bed element between an extended position and a retracted position. The trailer coupler may be positioned closer to the ground surface in the extended position and farther from the ground surface in the retracted position.

In further embodiments, the bed element and tow element may each comprise a one or more pin apertures, and the bed element and tow element may be movably coupled together in a telescoping relationship by aligning a pin aperture of the bed element with a pin aperture of the tow element and then inserting a pin through the pin apertures.

In further embodiments, elements of the apparatus, such as transportation conveyances, frame, axle assembly, towing arm, and/or optional rails, may comprise one or more pins and/or one or more pin apertures configured to temporarily couple two elements together. Elements of the apparatus may be temporarily coupled or removably coupled together thereby allowing the apparatus to be disassembled into a compact state. For example, by uncoupling, such as by removing the pins 41 from the pin apertures of one or more elements, the one or more elements may be separated from each other allowing the apparatus to be stored under the vehicle, such as an all-terrain-vehicle or utility-task-vehicle, that was used to tow the apparatus. By storing the apparatus under a vehicle, additional space around the vehicle may be made available for use and the apparatus may also be protected from the environment and theft.

BRIEF DESCRIPTION OF THE DRAWINGS

Some embodiments of the present invention are illustrated as an example and are not limited by the figures of the accompanying drawings, in which like references may indicate similar elements and in which.

DETAILED DESCRIPTION OF THE INVENTION

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

New modular trailer apparatuses are discussed herein. In the following description, for purposes of explanation, numerous specific details are set forth in order to provide a thorough understanding of the present invention. It will be evident, however, to one skilled in the art that the present invention may be practiced without these specific details.

The present disclosure is to be considered as an exemplification of the invention, and is not intended to limit the invention to the specific embodiments illustrated by the figures or description below.

Figure 1:
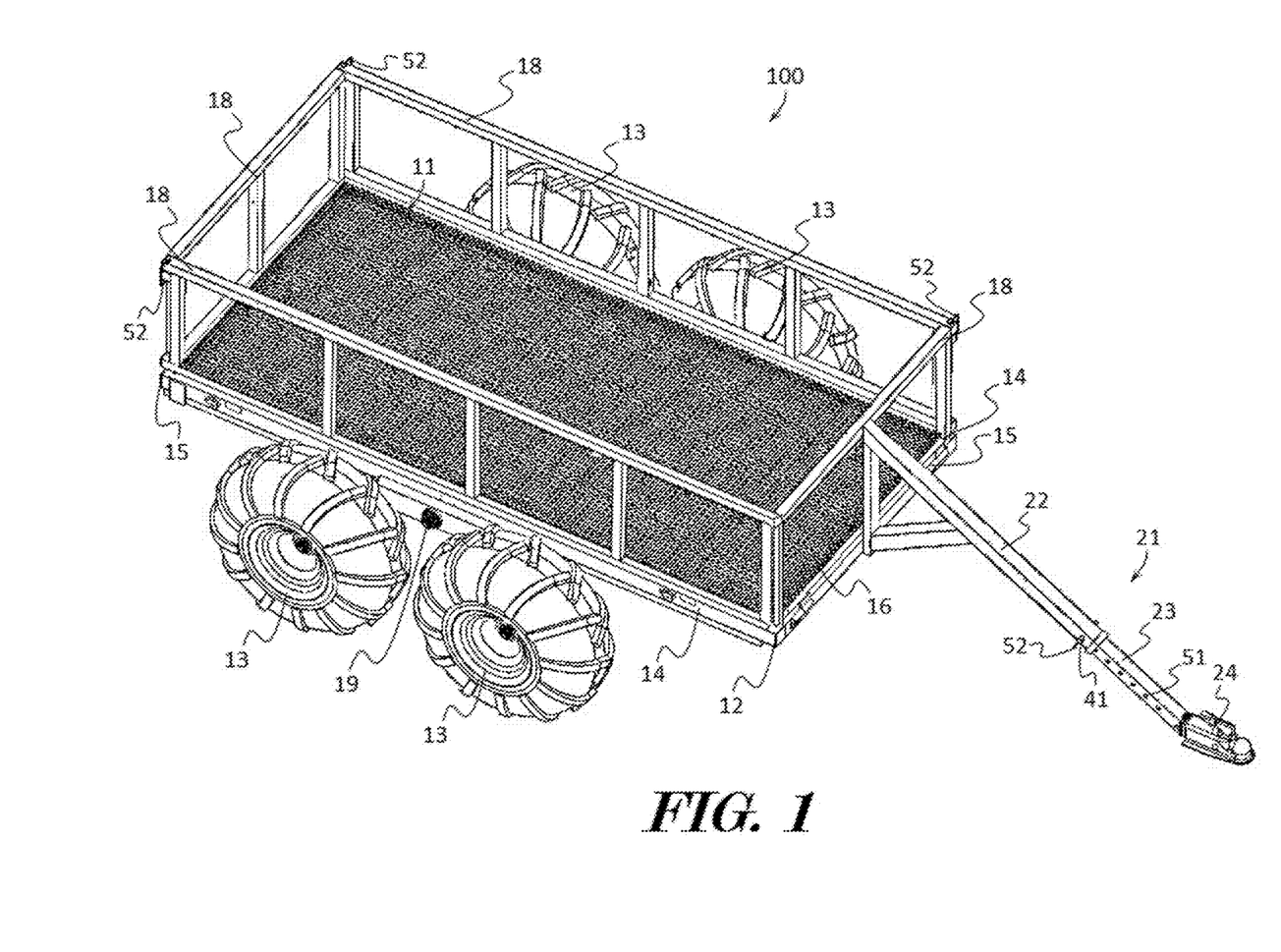
FIG. 1 depicts a perspective view of an example of a modular trailer apparatus according to various embodiments described herein.
Figure 2:
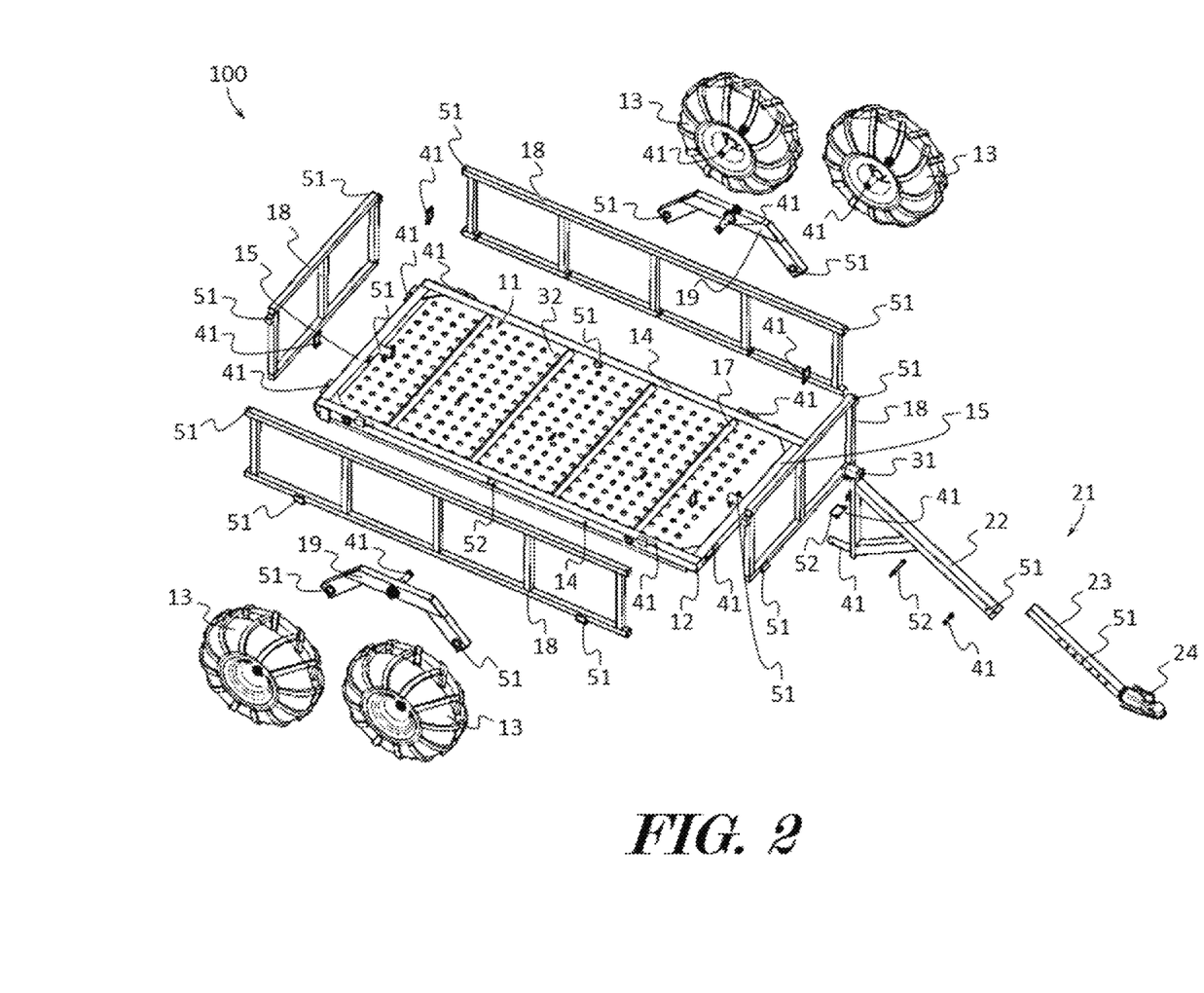
FIG. 2 illustrates a perspective exploded view of an example of a modular trailer apparatus according to various embodiments described herein.

The present invention will now be described by example and through referencing the appended figures representing preferred and alternative embodiments. FIG. 1 depicts an example of a modular trailer apparatus ("the apparatus") 100 according to various embodiments, while FIG. 2 illustrates a perspective exploded view of an example of a modular trailer apparatus 100 according to various embodiments described herein. In preferred embodiments, the apparatus may comprise a bed 11 coupled to a frame 12 having a length and width. A first transportation conveyance 13 for contacting a ground surface and a second transportation conveyance 13 for contacting a ground surface 300 may be coupled to opposing sides of the frame 12. The apparatus 100 may further include a towing arm 21 comprising a bed element 22 movably coupled to a tow element 23. The bed element 22 may be coupled to the frame 12 and the tow element 23 may be coupled to a trailer coupler 24 configured to be secured to ball hitches or any other tow hitch.

In some embodiments, the apparatus 100 may comprise a bed 11 of a generally planar rectangular prism shape configured with a length formed by two opposing and parallel major frame members 14 and two opposing and parallel minor frame members 15 perpendicularly coupled to the major frame members 14. The bed 11 may be configured to support cargo and may be formed by one or more lateral supports 17 which may be coupled to the frame 12. In some embodiments, the apparatus 100 may comprise a bed panel 16 formed by a generally planar sheet of material, such as a mesh sheet, which may be removably placed or coupled to the bed 11 to prevent smaller objects from falling through the bed 11. In some embodiments, a bed panel 16 may be made with or formed with sheets of metal, sheets of metal mesh, wood panels, or any other suitable planar material. The frame 12 and/or elements of the frame 12, such as major frame members 14, minor frame members 15, lateral supports 17, may be made from or comprise metal piping, metal tubing, sheets of metal mesh, wood panels, or any other suitable material.

In some embodiments, one or more axle assemblies 19 may be temporarily coupled to two opposing sides of the frame 12 and one or more transportation conveyances 13 may be temporarily coupled to each axle assembly 19. Additionally, one or more rails 18 may be temporarily coupled proximate to each of the four perimeter surfaces 11B of the bed 11, and a towing arm 21 may be temporarily coupled proximate to the frame members 14, 15, that may be generally perpendicular to the bed 11 and which may prevent cargo from tumbling off the bed 11.

In some embodiments, elements of the apparatus 100, such as transportation conveyances 13, frame 12, axle assembly 19, towing arm 21, and/or optional rails 18, may comprise one or more pins 41 and/or one or more pin apertures 51 configured to temporarily couple two elements together. Elements of the apparatus 100 may be temporarily coupled or removably coupled together thereby allowing the apparatus 100 to be disassembled into a compact state. For example, by uncoupling, such as by removing the pins 41 from the pin apertures 51 of one or more elements, the one or more elements may be separated from each other allowing the apparatus 100 to be stored under the vehicle, such as an all-terrain-vehicle or utility-task-vehicle, that was used to tow the apparatus 100. By storing the apparatus 100 under a vehicle, additional space around the vehicle may be made available for use and the apparatus 100 may also be protected from the environment and theft.

A pin 41 may be coupled to a pin aperture 51 by inserting the pin 41 into the pin aperture 51. The pin 41 may be temporarily retained in the pin aperture 51 with a pin retainer 52 (FIGS. 1, 2, 8, 9, and 11-13) which may be temporarily coupled to the pin 41 to prevent the pin 41 from exiting the pin aperture 51. By separating or uncoupling the pin retainer 52 from the pin 41, the pin 41 may be separated from the pin aperture 51. In further embodiments, the pin apertures 51 and pins 41 of the apparatus 100 may be of a complimentary size and shape allowing a pin aperture 51 of one element to receive a pin 41 of one or more other elements.

In some embodiments, a pin 41 may be configured in a generally elongated cylindrical shape. A pin aperture 51 may similarly comprise a cylindrical shaped aperture configured with a diameter that is complementary in shape to the pin 41 allowing the pin 41 to be inserted into the pin aperture 51. In further embodiments, a pin aperture 51 may comprise one or more ball bearings or other mechanical friction reducing machine element allowing the pin 41 to rotate freely while inserted in the pin aperture 51. In other embodiments, a pin 41 may comprise a threaded type fastener, clip type fastener, clasp type fastener, a turn-to-lock type connection method, a slide-to-lock type connection method, or any other suitable temporary connection method as one reasonably skilled in the art could envision to serve the same function of temporarily securing within a pin aperture 51.

In some embodiments, the apparatus 100 may comprise one or more transportation conveyances 13 which may be configured to facilitate the movement of the apparatus 100 across off-road and on-road surfaces. Preferably, the transportation conveyances 13 are configured to reduce the friction between the apparatus 100 and the surface over which it is desired to be moved without requiring the towing vehicle to bear the full weight of the apparatus 100. A transportation conveyance 13 may comprise a wheel as shown in the examples depicted in FIGS. 1-3, 5, and 8-13, a caster, a tread or track, a low friction pad or bumper, a low friction plate, a ski, a pontoon, or any other suitable device configured to reduce the friction between the apparatus 100 and the surface over which it is desired to be moved. A transportation conveyances 13 may comprise a substantially rigid material such as hard plastics, metal, and metal alloys, fiberglass, ceramics, resins, wood, hard rubber, substantially flexible materials such as nylon webbing, cotton webbing, other types of webbing, other types of fabrics, flexible plastics, flexible rubber, or any other material suitable for use as a transportation conveyances 13 and facilitating the movement of the apparatus 100.

Figure 3:
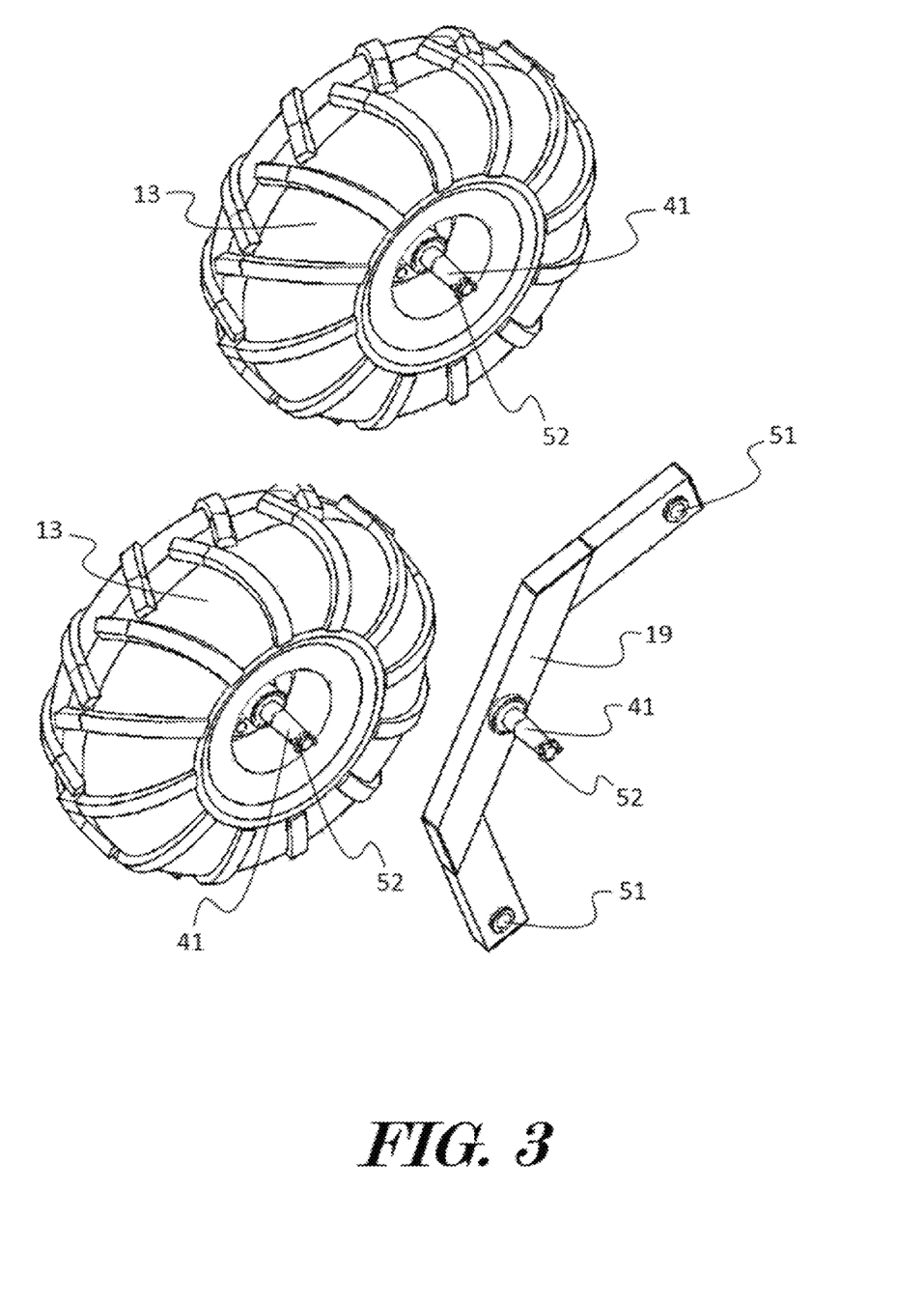
FIG. 3 shows a perspective view of an example of an axle assembly and two transportation conveyances according to various embodiments described herein.

Turning now to FIG. 3, a perspective view of an example of an axle assembly 19 and two transportation conveyances 13 according to various embodiments described herein is shown. In some embodiments, an axle assembly 19 may be configured to temporarily couple one, two, three, or more transportation conveyances 13. The apparatus 100 may comprise a plurality of pins 41 and a plurality of pin apertures 51, and each transportation conveyance 13 may be removably and movably or pivotally coupled to an axle assembly 19 by removably coupling a pin 41 within a pin aperture 51.

In some embodiments, a transportation conveyance 13 may comprise a pin 41 that is configured to temporarily couple to a pin aperture 51 on an axle assembly 19. In some embodiments, a transportation conveyance 13 may be temporarily and movably coupled to an axle assembly 19 by inserting the pin 41 of the transportation conveyance 13 into the pin aperture 51 of the axle assembly 19. In alternative embodiments, a transportation conveyance 13 may comprise a pin aperture 51 that is configured to temporarily couple to a pin 41 on an axle assembly 19. A transportation conveyance 13 may be temporarily and movably coupled to an axle assembly 19 by inserting the pin 41 of the axle assembly 19 into the pin aperture 51 of the transportation conveyance 13.

In preferred embodiments, the apparatus 100 may comprise four transportation conveyances 13 and the first and third transportation conveyances 13 may be coupled to a first axle assembly 19 and the first axle assembly 19 may be movably coupled to the frame 12. The second and fourth transportation conveyances 13 may be coupled to a second axle assembly 19 and the second axle assembly 19 may be movably coupled to the frame 12 opposite to the first axle assembly 19.

Figure 4:
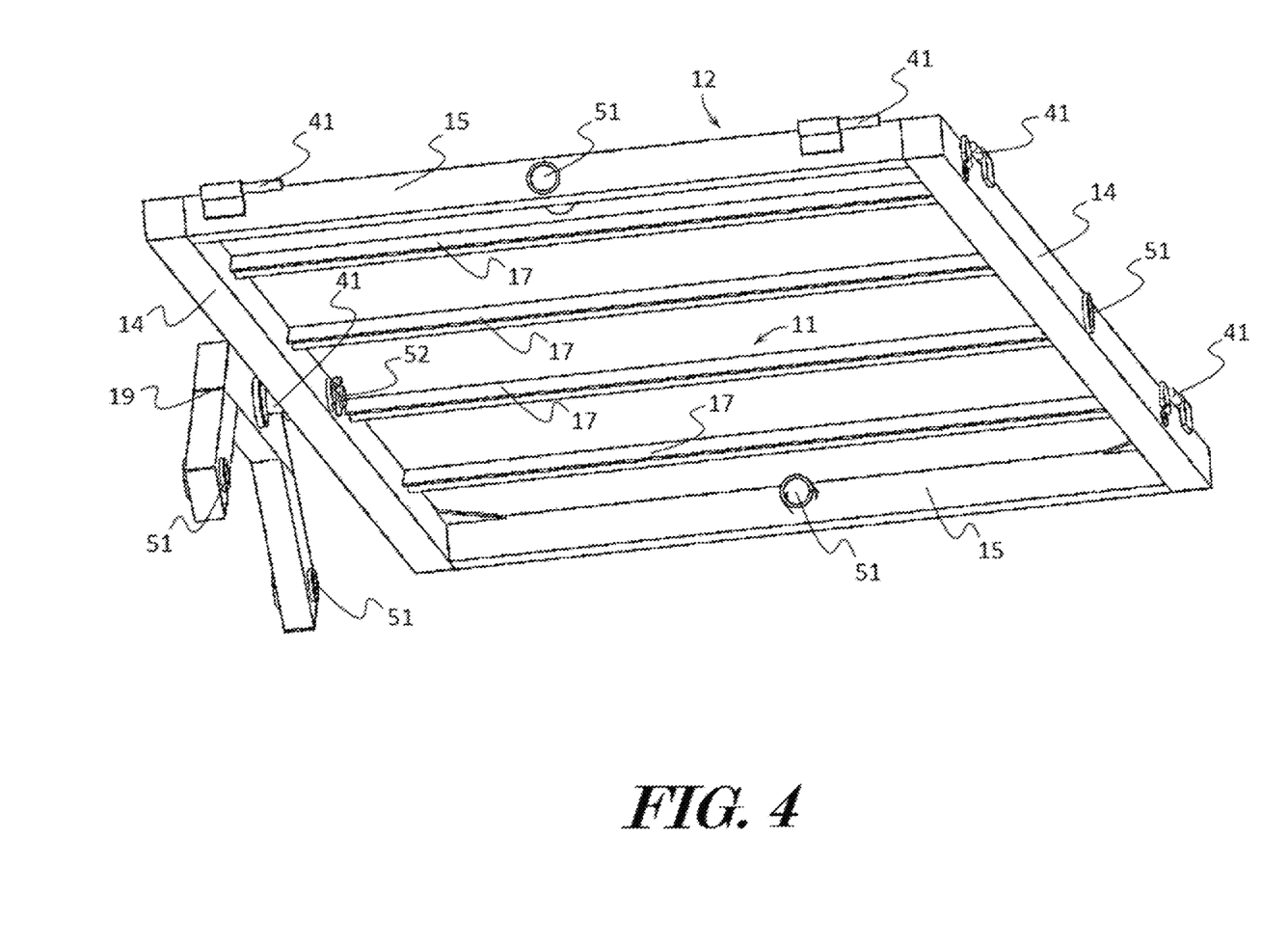
FIG. 4 depicts a bottom perspective view of an example of an axle assembly coupled to the frame according to various embodiments described herein.

FIG. 4 depicts a bottom perspective view of an example of an axle assembly 19 coupled to the frame 12 according to various embodiments described herein. In this example, the axle assembly 19 comprises a pin 41 positioned generally centrally on the axle assembly 19, a first pin aperture 51 positioned proximate to a first end of the axle assembly 19, and a second pin aperture 51 positioned proximate to a second end of the axle assembly 19. The frame 12 may comprise one or more pin apertures 51 on or proximate to each of the frame members 14, 15. In further embodiments, a pin 41 of an axle assembly 19 may be configured to pivot or rotate while coupled to a pin aperture 51 on the frame 12 allowing the axle assembly 19 to pivot or rotate relative to the frame 12 and function as an independent axle.

In some embodiments, an axle assembly 19 may be temporarily coupled to the frame 12 by inserting a pin 41 of the axle assembly 19 into a pin aperture 51 of the frame 12. In alternative embodiments, an axle assembly 19 may comprise a pin aperture 51 and a frame 12 may comprise one or more pins 41 on or proximate to each of the frame members 14, 15. An axle assembly 19 may be temporarily coupled to the frame 12 by inserting a pin 41 of the frame 12 into the pin aperture 51 of the axle assembly 19.

As perhaps best shown in FIGS. 1-4, 8, and 9, a pin 41 may be temporarily retained in a pin aperture 51 with a pin retainer 52 which may be temporarily coupled to the pin 41 to prevent the pin 41 from exiting the pin aperture 51. By separating or uncoupling the pin retainer 52 from the pin 41, the pin 41 may be separated from the pin aperture 51. In some embodiments, a pin retainer 52 may comprise an R-clip, R-pin, R-key, hairpin cotter pin, hairpin cotter, bridge pin, hitch pin or spring cotter pin, or any other suitable fastener that may be temporarily attached to a pin 41 to prevent the pin 41 from exiting a pin aperture 51.

Figure 5:
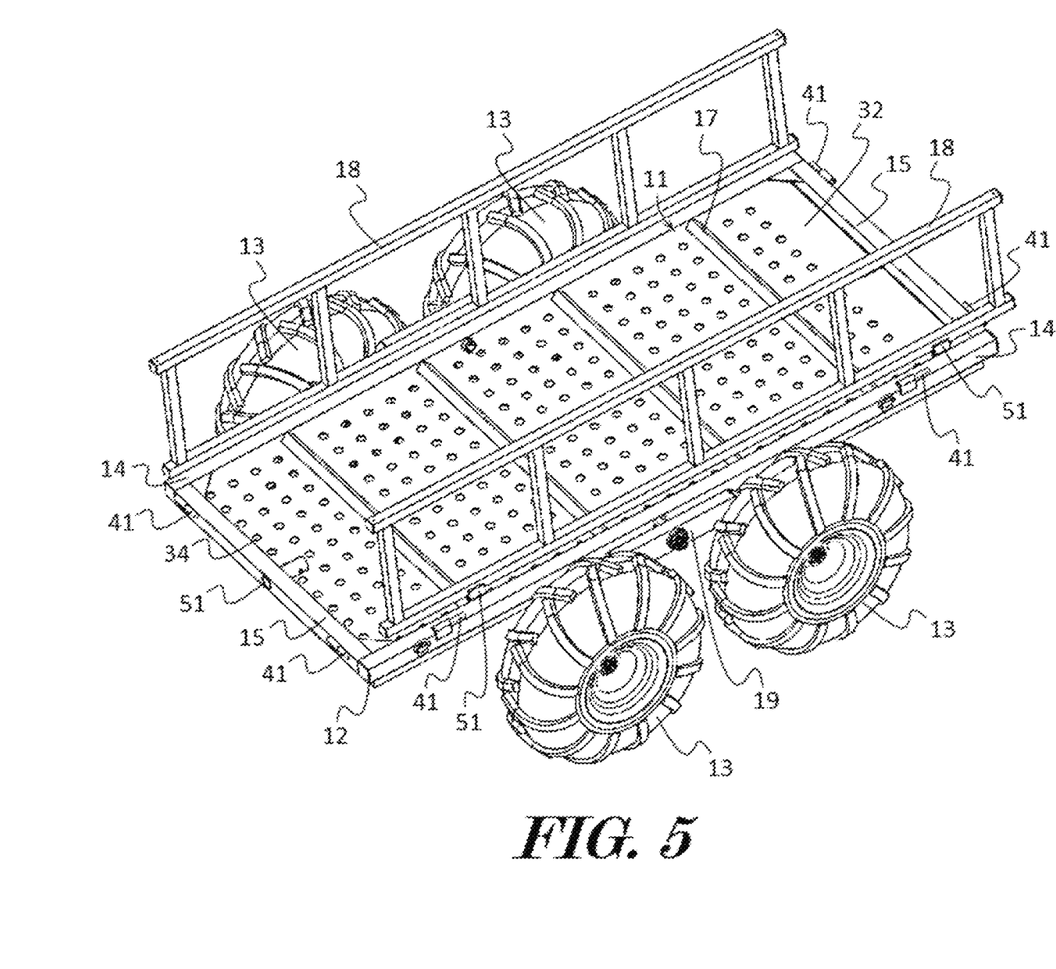
FIG. 5 illustrates a top perspective view of an example of a frame, two axle assemblies, four transportation conveyances, and two rails of a modular trailer apparatus according to various embodiments described herein.
Figure 6:
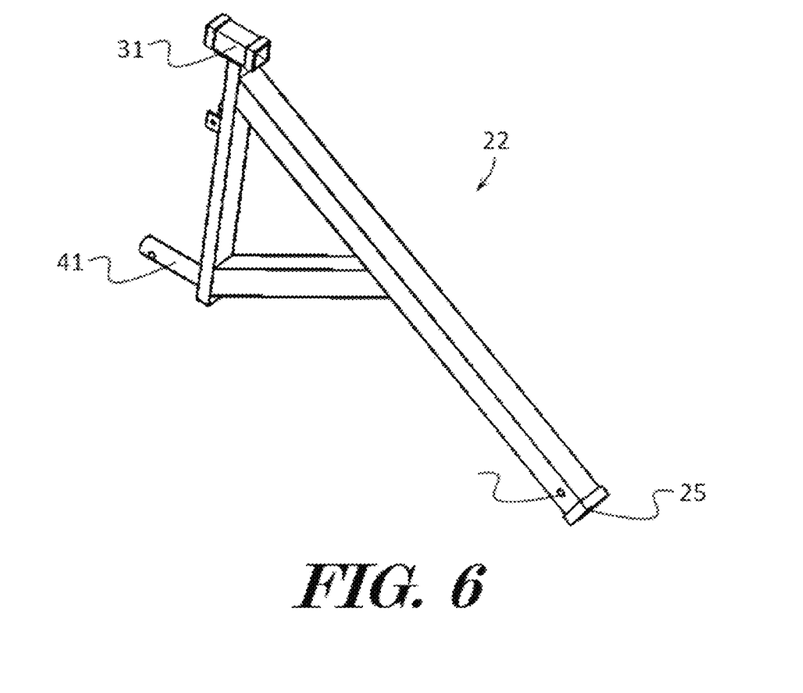
FIG. 6 shows a top perspective view of an example of a bed element of a towing arm according to various embodiments described herein.
Figure 7:
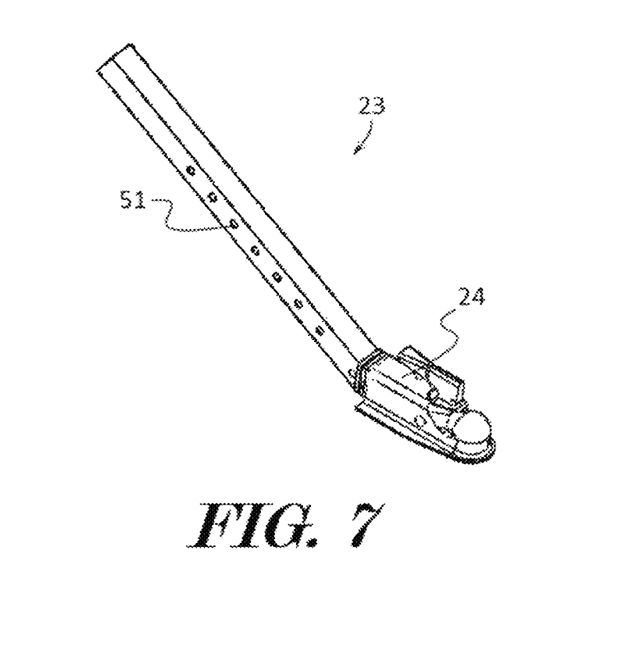
FIG. 7 depicts a top perspective view of an example of a tow element of a towing arm according to various embodiments described herein.

FIG. 5 illustrates a top perspective view of an example of a frame 12, two axle assemblies 19, four transportation conveyances 13, and two rails 18 of a modular trailer apparatus 100 (FIGS. 1, 2, 11-13) according to various embodiments described herein. In this embodiment, one or more rails 18 may be temporarily coupled to the frame 12. One or more rails 18 may be temporarily coupled to the frame 12 to prevent cargo from accidentally falling off of the bed 11. Optionally one or more rails 18 may be placed against the bed 11 and used as a ramp to transport cargo on and off the bed 11. In further embodiments, one or more rails 18 may be temporarily coupled to the frame 12 proximate to each of the frame members 14, 15. In still further embodiments, one or more rails 18 may be temporarily coupled anywhere on the frame 12.

In some embodiments, the apparatus may comprise two or more, such as a plurality, of pins 41 and two or more, such as a plurality, of pin apertures 51, and a rail 18 may be removably coupled to the frame 12 by removably coupling a pin 41 within a pin aperture 51. In further embodiments, a rail 18 may comprise one or more pin apertures 51 and a frame 12 may comprise one or more pins 41. A rail 18 may be temporarily coupled to the frame 12 by inserting a pin 41 of the frame 12 into a pin aperture 51 of the rail 18. Preferably, the pin 41 may be configured to pivot or rotate within the pin aperture 51 allowing a rail 18 to pivot or rotate relative to the frame 12. A pin 41 may be temporarily retained in a pin aperture 51 with a pin retainer 52 which may be temporarily coupled to the pin 41 to prevent the pin 41 from exiting the pin aperture 51.

In alternative embodiments, a rail 18 may comprise one or more pins 41 and a frame 12 may comprise one or more pin apertures 51. A rail 18 may be temporarily coupled to the frame 12 by inserting a pin 41 of the rail 18 into a pin aperture 51 of the frame 12. Preferably, the pin 41 may be configured to pivot or rotate within the pin aperture 51 allowing a rail 18 to pivot or rotate relative to the frame 12. A pin 41 may be temporarily retained in a pin aperture 51 with a pin retainer 52 which may be temporarily coupled to the pin 41 to prevent the pin 41 from exiting the pin aperture 51.

In some embodiments and as shown in FIGS. 1 and 11-13, a rail 18 may be configured to temporarily couple to one or more other rails 18. A rail 18 may comprise one or more pin apertures 51 that may be aligned with one or more pin apertures 51 of another rail 18 when a portion of each of the two rails 18 are temporarily coupled proximate to each other on the frame 12. The two rails 18 may be temporarily coupled to each other by inserting a pin 41 through a first pin aperture 18 of a first rail 18 and into a second pin aperture 51, which is aligned with the first pin aperture 18, on a second rail 18. A pin 41 may be temporarily retained the pin apertures 51 with a pin retainer 52 which may be temporarily coupled to the pin 41 to prevent the pin 41 from exiting the pin apertures 51.

Figure 8:
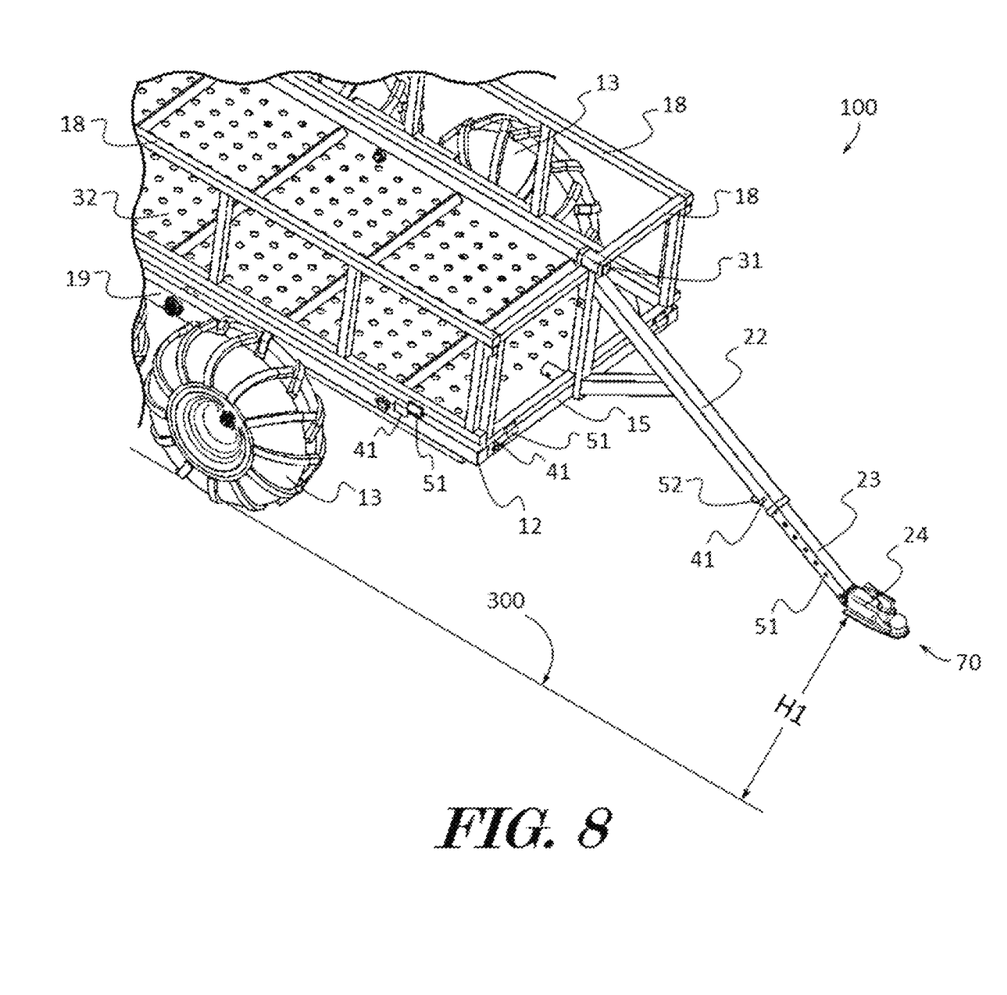
FIG. 8 illustrates a top perspective view of a portion of a modular trailer apparatus with the towing arm in an extended position according to various embodiments described herein.
Figure 9:
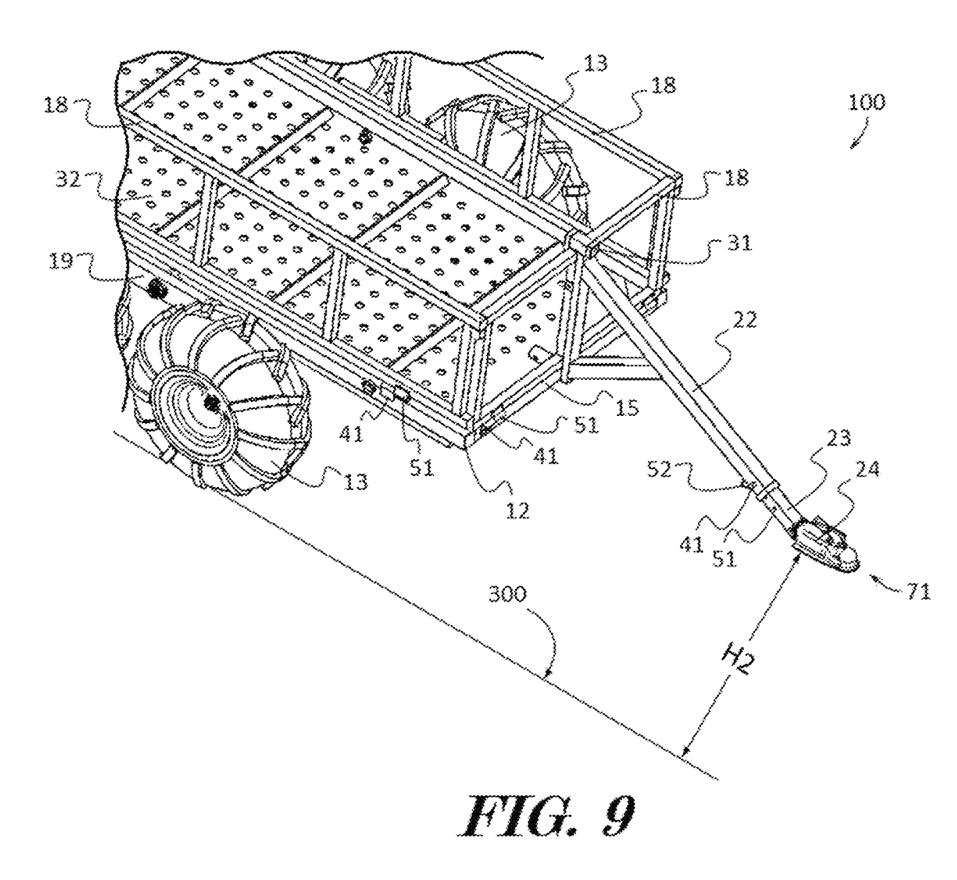
FIG. 9 shows a top perspective view of a portion of a modular trailer apparatus with the towing arm in a retracted position according to various embodiments described herein.

Referring now to FIGS. 6-10, a modular trailer apparatus 100 may comprise a towing arm 21 that may be temporarily coupled to the frame 12 and/or a rail 18. As shown in FIGS. 8 and 9, in some embodiments, a tow element 23 of a towing arm 21 may comprise a pin 41 that may be temporarily inserted and coupled within a pin aperture 51 on the frame 12. Preferably, the pin 41 may be configured to pivot or rotate within the pin aperture 51 allowing the tow element 23 and therefore the towing arm 21 to be rotatably coupled to the frame 12. A pin 41 may be temporarily retained in a pin aperture 51 with a pin retainer 52 which may be temporarily coupled to the pin 41 to prevent the pin 41 from exiting the pin aperture 51.

In alternative embodiments, a frame 12 may comprise one or more pins 41 and a tow element 23 of a towing arm 21 may comprise one or more pin apertures 51. A towing arm 21 may be temporarily coupled to the frame 12 by inserting a pin 41 of the frame 12 into a pin aperture 51 of the tow element 23. Preferably, the pin 41 may be configured to pivot or rotate within the pin aperture 51 allowing the tow element 23 and therefore the towing arm 21 to be rotatably coupled to the frame 12. A pin 41 may be temporarily retained in a pin aperture 51 with a pin retainer 52 which may be temporarily coupled to the pin 41 to prevent the pin 41 from exiting the pin aperture 51.

Figure 10:
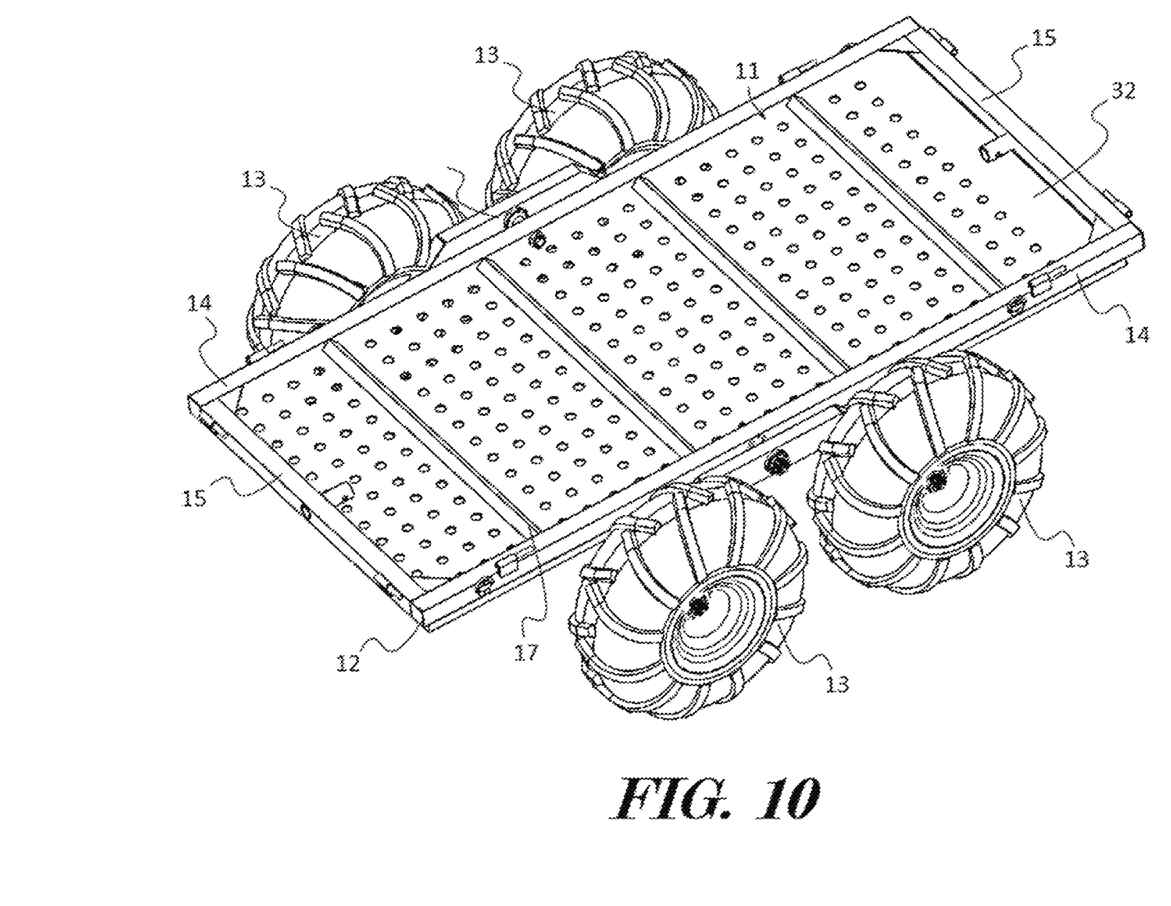
FIG. 10 depicts a top perspective view of an example of a deck coupled beneath the frame of a modular trailer apparatus according to various embodiments described herein.
Figure 11:
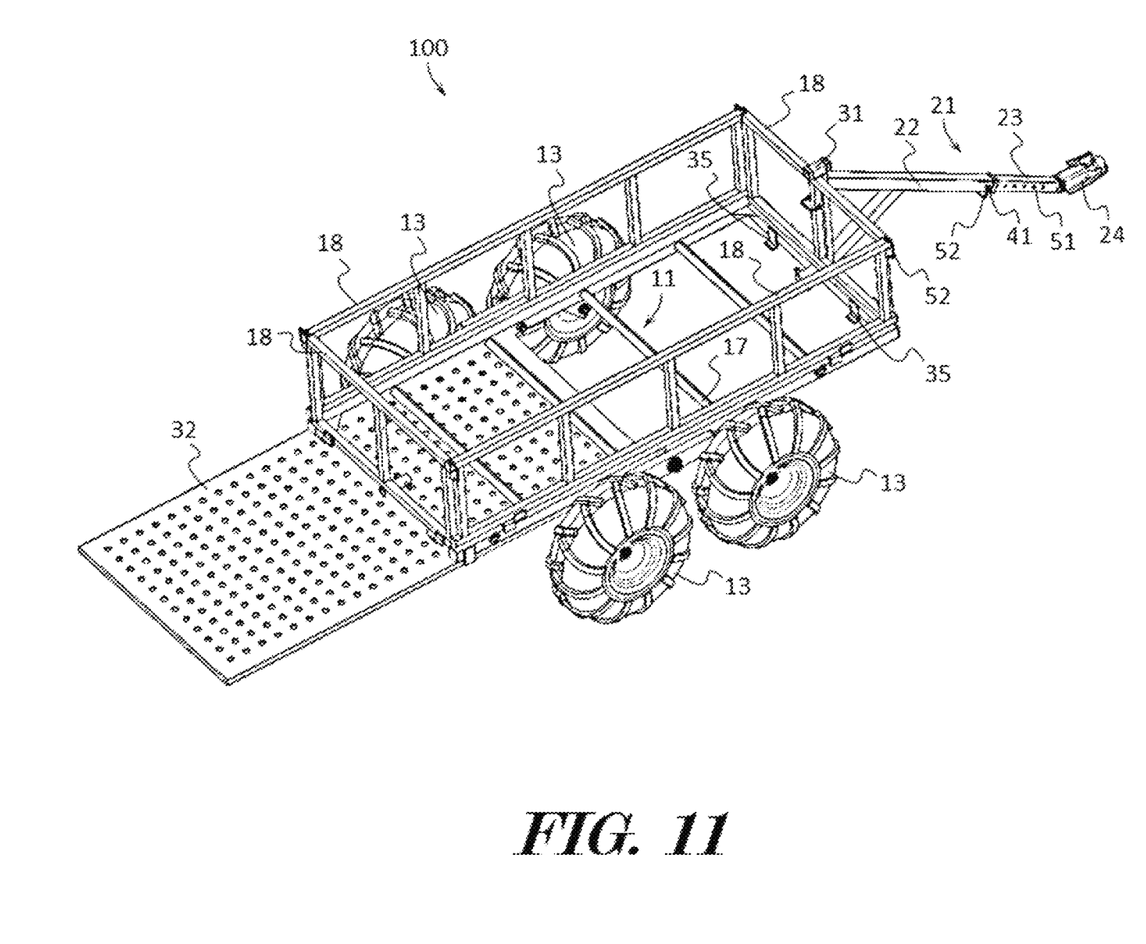
FIG. 11 illustrates a top perspective view of an example of a deck partially removed from beneath the frame of a modular trailer apparatus according to various embodiments described herein.

A towing arm 21 may comprise a bed element 22 (FIGS. 8-10) and a tow element 23 (FIGS. 10-11). In some embodiments, a bed element 22 may comprise one or more pin apertures 51 and a tow element 23 may also comprise one or more pin apertures 51. A bed element 22 may be temporarily coupled to a tow element 23 by aligning one or more pin apertures 51 on a bed element 22 with one or more pin apertures 51 on a tow element 23 and inserting one or more pins 41 through one or more of the aligned pin apertures 51. A pin 41 may be temporarily retained in a pin aperture 51 with a pin retainer 52 which may be temporarily coupled to the pin 41 to prevent the pin 41 from exiting the pin aperture 51.

In the embodiment depicted in FIG. 10, a bed element 22 may comprise a cavity 25 that is configured to receive a portion of a tow element 23. Optionally, the towing arm 21 may be configured to angle down towards the surface that the transportation conveyances 13 (FIGS. 1-9) of the apparatus 100 are contacting and the trailer coupler 24 may be coupled at a complimentary angle to the tow element 23 so that once the towing arm 21 is coupled to the frame 12, the trailer coupler 24 may be oriented relatively parallel to the frame 12 and/or the vehicle to which the apparatus 100 is to be towed by. The tow element 23 may be inserted into the cavity 25 of the bed element 22 to one or more depths in a telescoping relationship allowing the tow element 23 to retract into, extend from, or be removed from the cavity 25 and therefore, retract into, extend from, or be removed from the bed element 22.

As perhaps best shown by FIGS. 8 and 9, the tow element 23 may be is movably coupled to the bed element 22 between an extended position 70 (FIG. 8) and a retracted position 71 (FIG. 9). The trailer coupler 24 may be positioned closer to a ground surface 300 that the transportation conveyances 13 may be contacting in the extended position 70 and farther from the ground surface 300 in the retracted position 71. For example, when in an extended position 70, the trailer coupler 24 may be a first height (H1) above a ground surface 300 and when in a retracted position 71, the trailer coupler 24 may be a second height (H2) above a ground surface 300 so that H2 is greater than H1. In further embodiments, the tow element 23 may retract into or extend from the bed element 22 allowing the height of the trailer coupler 24 to be increased or decreased, respectively, relative to the ground surface 300 that the transportation conveyances 13 of the apparatus 100 are contacting by aligning different pin apertures 51 of a tow element 23 and bed element 22 and then inserting a pin through the aligned apertures 51. In still further embodiments, the tow element 23 may retract into or extend from the bed element 22 allowing the distance of the trailer coupler 24 to be increased or decreased, respectively, relative to the bed 11 of the apparatus 100 by aligning different pin apertures 51 of a tow element 23 and bed element 22 and then inserting a pin through the aligned apertures 51.

In some embodiments and as shown in FIGS. 2, 6, 8, 9, and 11, a towing arm 21 may comprise a mounting receiver 31 which may be configured to temporarily couple hitches, bars, poles, or other accessories. A mounting receiver 31 may allow accessories or cargo to be temporarily secured to the apparatus 100. In some embodiments, a deck panel 32 may be temporarily coupled to a mounting receiver 31 and/or to one or more rails 18 that can be used as a sleeping surface with the capability to add a collapsible cover 33 or tent which may be used as a shelter.

Figure 12:
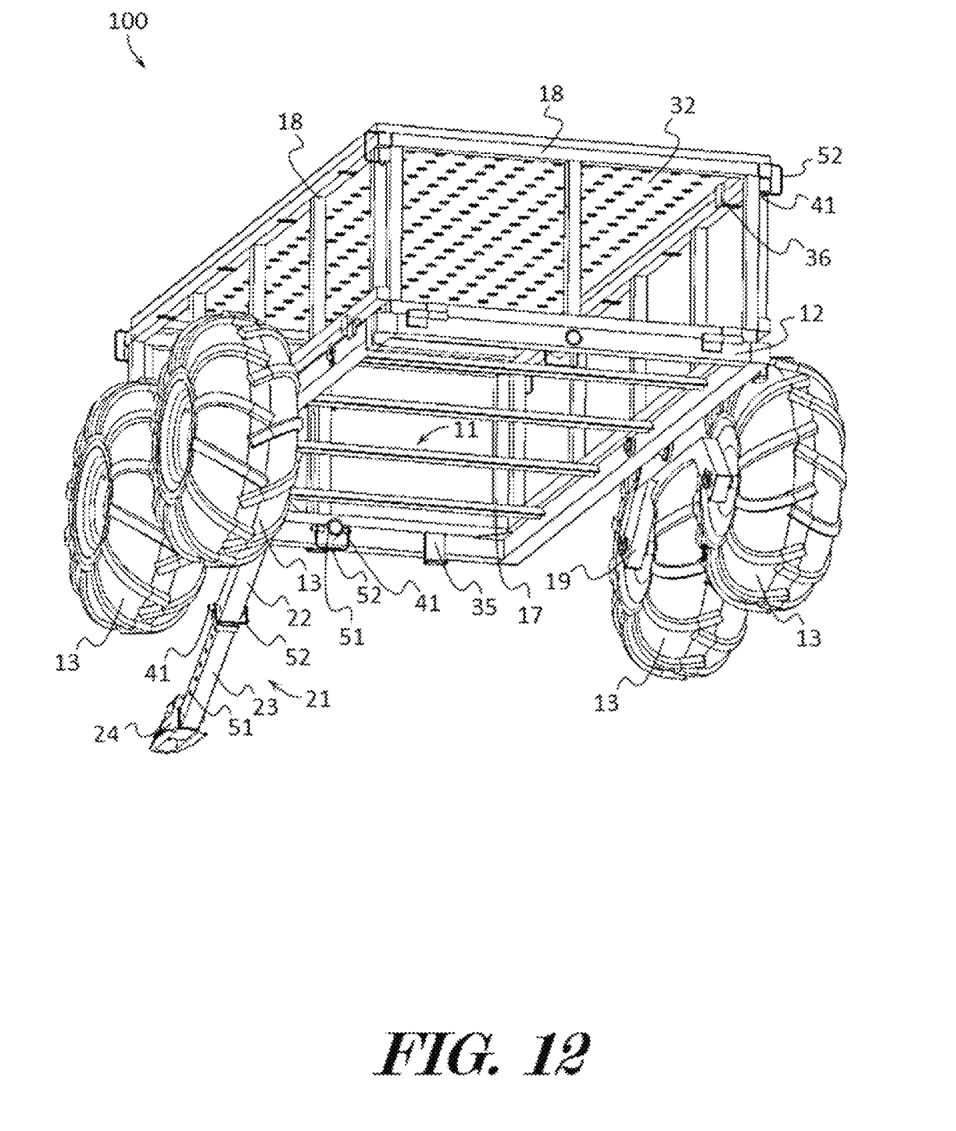
FIG. 12 shows a top perspective view of an example of a deck coupled above the frame of a modular trailer apparatus according to various embodiments described herein.

Turning now to FIGS. 10-12, in some embodiments, a modular trailer apparatus 100 (FIGS. 1, 2, 11-13) may comprise a deck panel 32 which may provide alternative support surfaces on the apparatus 100. A deck panel 32 may be configured to be generally planar rectangular in shape and preferably complementary in shape to the frame 12 and/or bed 11. Optionally, a deck panel 32 may comprise one or more deck apertures 34 which may be configured to let smaller objects, such as dirt and water, to pass through the deck panel 32 while preventing larger objects, such as cargo and people, from passing through the deck panel 32. A deck panel 32 may be made from a substantially rigid material, such as plastic, wood, metal, or any other suitable material for supporting larger objects. In some embodiments, a deck panel 32 may be placed on the frame 12 to serve the same function as a bed panel 16. In further embodiments, a deck panel 32 may be placed on the bed 11 to provide an alternative surface for larger objects.

In some embodiments, the deck panel 32 may be stored below the bed 11 by being coupled to the frame 12 below the bed 11 as shown in FIGS. 10 and 11. Any suitable method of coupling a deck panel 32 below the bed 11 may be used. For example, one or more "L" shaped deck brackets 35 may be coupled to the frame 12 which may support the deck panel 32 below the bed 11 and above a ground surface 300. In another example, one or more support bars or lateral supports 17 may act as a shelf and may be coupled to the frame 12 to support the deck panel 32 below the bed 11 and above a ground surface 300.

Figure 13:
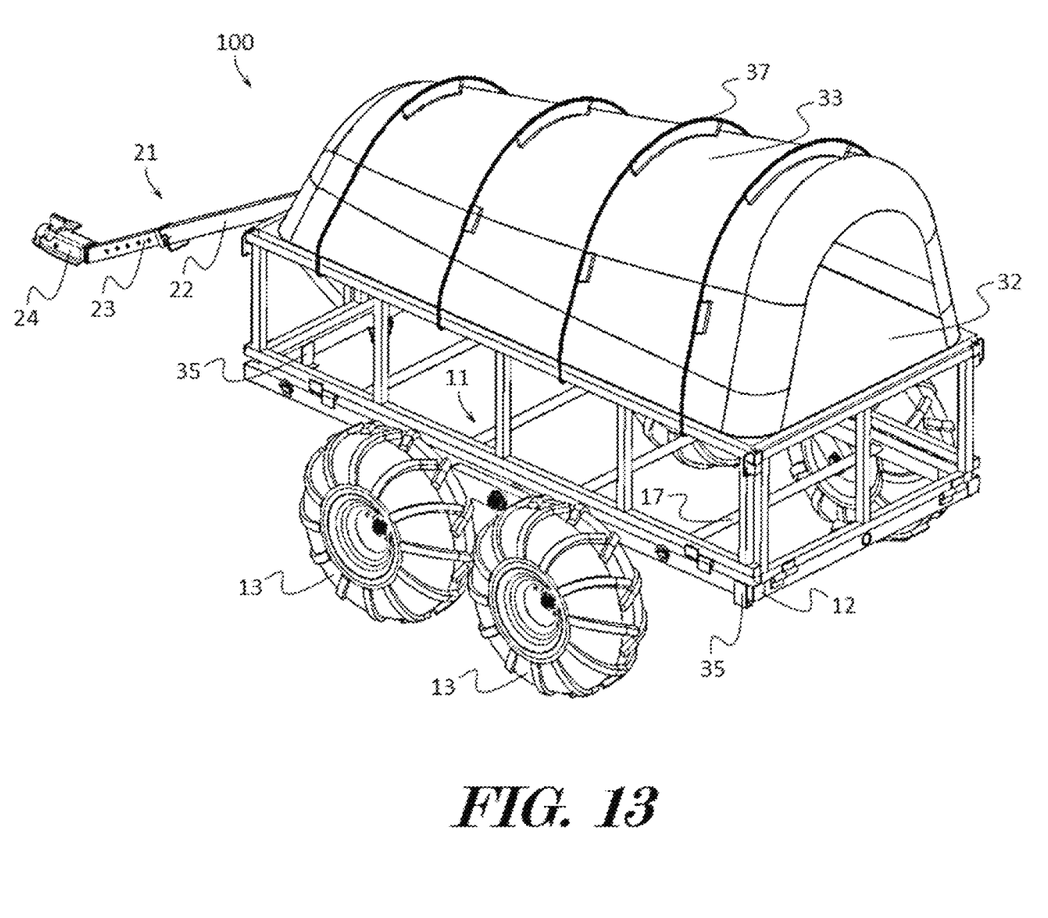
FIG. 13 depicts a top perspective view of an example of a collapsible cover coupled to an example of a modular trailer apparatus 100 according to various embodiments described herein FIG. 14 a perspective view of an example of a trailer coupler and a partial perspective view of an example of a tow element according to various alternative embodiments described herein.

In some embodiments, when the deck panel 32 is not in use it may be stored below the frame 12 as shown in FIGS. 2, 5, 8-11 and then slid out or otherwise removed from under the frame 12 (FIG. 11) where it may optionally be placed and/or coupled to the top of one or more rails 18 as depicted in FIGS. 12 and 13. Optionally, the deck panel 32 may comprise one or more positioning tabs 36 or protrusions which may extend away from the deck panel 32 to contact portions of a rail 18 and/or frame 12 to maintain the position of the deck panel 32 on the apparatus 100. In other embodiments, one or more pins 41 and pin apertures 51 may be used to position or secure a deck panel 32 to a rail 18 and/or frame 12.

FIG. 13 depicts a top perspective view of an example of a collapsible cover 33 which may function as a shelter coupled to a deck panel 32 and/or one or more rails 18 of a modular trailer apparatus 100 according to various embodiments described herein. In some embodiments, the apparatus 100 may comprise a collapsible cover 33 which may be formed by a natural fabric material, synthetic fabric material, plastic sheeting, or any other suitable collapsible material such as those used to make tents, awnings, and the like. One or more poles 37 may support the collapsible cover 33 and may also be coupled to the deck panel 32 and/or one or more rails 18 to anchor or secure the collapsible cover 33 to the apparatus 100. The collapsible cover 33 of FIG. 13 is exemplary in that it may be formed by foldable or generally rigid walls or ceilings or any other travel or collapsible structure. Preferably, the deck panel 32 and/or one or more rails 18 may include one or more apertures which may be configured to receive portions of one or more poles 37 or other components of the collapsible cover 33 to facilitate the coupling of the collapsible cover 33 to the apparatus 100.

Figure 14:
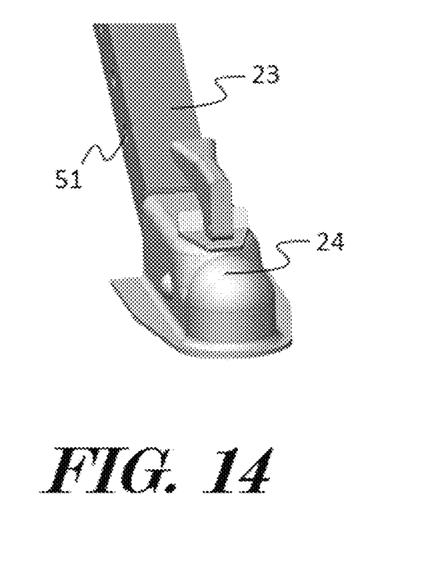
Figure 15:
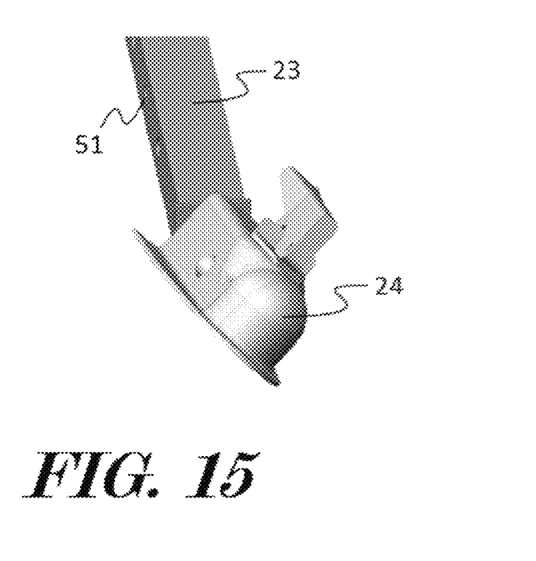
FIG. 15 a perspective view of an example of a trailer coupler and a partial perspective view of an example of a tow element according to various alternative embodiments described herein.
Figure 16:
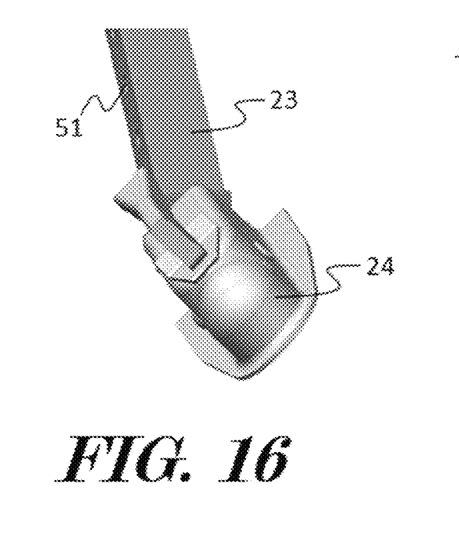
FIG. 16 a perspective view of an example of a trailer coupler and a partial perspective view of an example of a tow element according to various alternative embodiments described herein.

FIGS. 14-16 illustrate a perspective view of an example of a trailer coupler 24 and a partial perspective view of an example of a towing arm 21 according to various alternative embodiments described herein. In these embodiments, the trailer coupler 24 may be pivotally or rotatably coupled to the tow element 23 allowing the trailer coupler 24 to rotate relative to the tow element 23 and therefore, relative to the apparatus 100. In some embodiments, a trailer coupler 24 may be pivotally or rotatably coupled to a tow element 23 with a bearing or other suitable pivotal or rotatable coupling.

While some materials have been provided, in other embodiments, the elements that comprise the apparatus 100 such as the transportation conveyances 13, frame 12, axle assembly 19, towing arm 21, optional rails 18, optional bed panel 16, optional mounting receiver 31, optional deck panel 32, optional collapsible cover 33, optional deck brackets 35, optional positioning tabs 36, optional poles 37, and/or any other element discussed herein may be made from durable materials such as aluminum, steel, other metals and metal alloys, wood, hard rubbers, hard plastics, fiber reinforced plastics, carbon fiber, fiber glass, resins, polymers or any other suitable materials including combinations of materials. Additionally, one or more elements may be made from or comprise durable and slightly flexible materials such as soft plastics, silicone, soft rubbers, or any other suitable materials including combinations of materials. In some embodiments, one or more of the elements that comprise the apparatus 100 may be coupled or connected together with heat bonding, chemical bonding, adhesives, clasp type fasteners, clip type fasteners, rivet type fasteners, threaded type fasteners, other types of fasteners, or any other suitable joining method. In other embodiments, one or more of the elements that comprise the tool 100 may be coupled or removably connected by being press fit or snap fit together, by one or more fasteners such as hook and loop type or Velcro® fasteners, magnetic type fasteners, threaded type fasteners, sealable tongue and groove fasteners, snap fasteners, clip type fasteners, clasp type fasteners, ratchet type fasteners, a push-to-lock type connection method, a turn-to-lock type connection method, slide-to-lock type connection method or any other suitable temporary connection method as one reasonably skilled in the art could envision to serve the same function. In further embodiments, one or more of the elements that comprise the apparatus 100 may be coupled by being one of connected to and integrally formed with another element of the apparatus 100.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention, are contemplated thereby, and are intended to be covered by the following claims.

What is claimed is:

1. A modular trailer apparatus, the apparatus comprising:
a bed coupled to a frame, the frame coupled to a rail, wherein a portion of the rail is positioned at a distance vertically above the bed;
a first transportation conveyance for contacting a ground surface and a second transportation conveyance for contacting the ground surface with both the first and the second transportation conveyances coupled to opposing sides of the trailer apparatus;
a third transportation conveyance for contacting the ground surface and a fourth transportation conveyance for contacting the ground surface with both the third and the fourth transportation conveyances coupled to opposing sides of the trailer apparatus;
wherein the first and the third transportation conveyances are temporarily and movably coupled to a first axle assembly by removably coupling a first pin within a first pin aperture,
wherein the first axle assembly is temporarily coupled to the frame, and
wherein the second and fourth transportation conveyances are temporarily and movably coupled to a second axle assembly by removably coupling a second pin within a second pin aperture,
wherein the second axle assembly is temporarily coupled to the frame opposite to the first axle assembly;
a bed element rotatably coupled to the frame, coupled to the portion of the rail, and extending at a first angle downwards away from the portion of the rail towards the ground surface;
a tow element removably coupled to the bed element and extending at the first angle downwards away from the bed element towards the ground surface; and
wherein the bed element and the tow element together form a towing arm configured to transition between an extended position where the towing arm is at a first height (H1) above the ground surface to a retracted position where the towing arm is at a second height (H2) above the ground surface and where the second height (H2) is greater than the first height (H1),
wherein the bed element comprises a third pin aperture and the tow element comprises fourth pin aperture,
wherein the bed element and the tow element are moveably coupled together in a telescoping relationship by aligning the third pin aperture of the bed element with the fourth pin aperture of the tow element and inserting a third pin through the third and the fourth pin apertures;
a trailer coupler, wherein the trailer coupler is:
mounted to a distal end of the tow element; and
rotatably coupled to the tow element;
a deck panel; and
a deck bracket,
wherein the deck panel is slidably engaged to the frame, and
wherein the deck panel is secured below the bed with the deck bracket.

2. A modular trailer apparatus, the apparatus comprising:
a bed coupled to a frame, the frame coupled to a rail, wherein a portion of the rail is positioned at a distance vertically above the bed;
a first transportation conveyance for contacting a ground surface and a second transportation conveyance for contacting the ground surface with both the first and the second transportation conveyances coupled to opposing sides of the trailer apparatus;
a bed element coupled to the portion of the rail and extending at a first angle downwards away from the portion of the rail towards the ground surface;
a tow element removably coupled to the bed element and extending at the first angle downwards away from the bed element towards the ground surface; and
wherein the bed element and the tow element together form a towing arm configured to transition between an extended position where the towing arm is at a first height (H1) above the ground surface to a retracted position where the towing arm is at a second height (H2) above the ground surface and where the second height (H2) is greater than the first height (H1),
a deck panel; and
a deck bracket,
wherein the deck panel is slidably engaged to the frame, and
wherein the deck panel is secured below the bed with the deck bracket.

* * * * *